June 7, 1949.  P. PEVNEY  2,472,724
SEAL
Filed June 26, 1944  3 Sheets-Sheet 1

INVENTOR.
Paul Pevney
BY Charles S. Wilson
ATTORNEY.

June 7, 1949.  P. PEVNEY  2,472,724
SEAL
Filed June 26, 1944  3 Sheets-Sheet 2
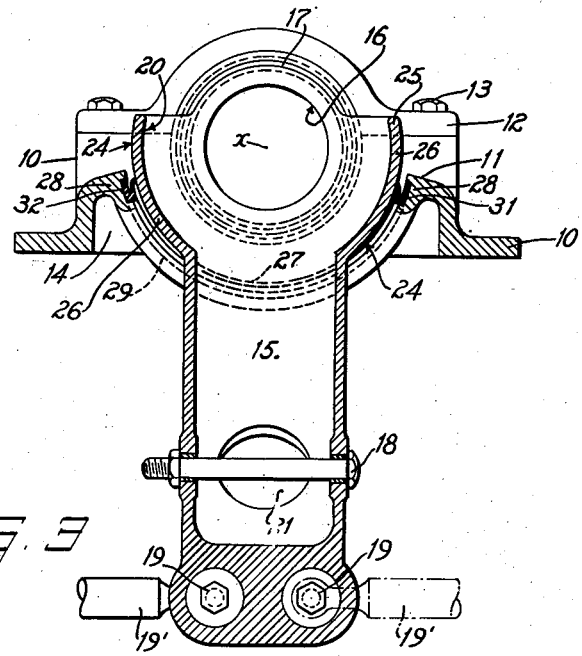
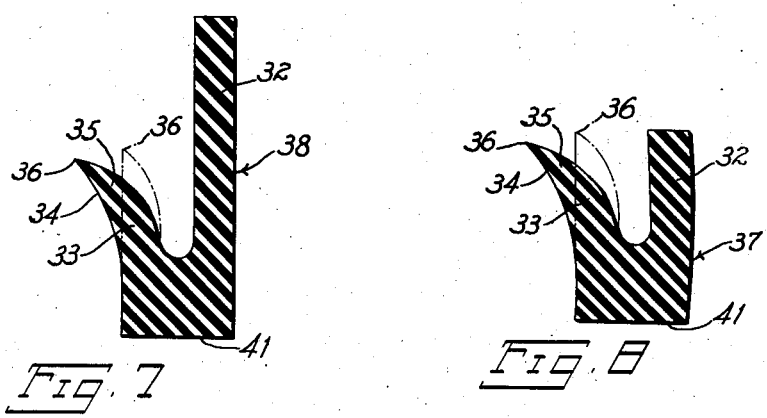
INVENTOR.
Paul Pevney
BY
ATTORNEY.

June 7, 1949.　　　　P. PEVNEY　　　　2,472,724
SEAL
Filed June 26, 1944　　　　3 Sheets-Sheet 3

INVENTOR.
Paul Pevney
BY Charles S. Wilson
ATTORNEY.

Patented June 7, 1949

2,472,724

UNITED STATES PATENT OFFICE 2,472,724

SEAL

Paul Pevney, Massapequa, N. Y., assignor to Republic Aviation Corporation, Farmingdale, N. Y., a corporation of Delaware Application June 26, 1944, Serial No. 542,061

10 Claims. (Cl. 244—83)

1

This invention relates generally to seals for the prevention of air or fluid leakage around a movable or oscillatory member, or between any stationary part having an opening and a coacting movable part movable within said opening. Especially, the present seal is designed to prevent the passage of air through an opening provided in the wall of a high pressure enclosure (such as the pressurized cabin of an aircraft) for the passage and movement of a control lever or other member passing therethrough or mounted therein.

While the instant invention is capable of use in conjunction with any pressure enclosure, through the wall of which a movable member oscillates or moves, it is particularly designed for use in conjunction with the control column or lever of high altitude aircraft in which an internal cabin pressure is maintained at the atmospheric pressure of a predetermined altitude, say for example 10,000 feet at all elevations above said altitude. In being so used the present device seals the aperture in the wall or partition defining the cabin floor through which the control lever passes so that both the predetermined pressure within the cabin and the freedom of movement of the control lever may be maintained and preserved.

With the above and other objects in view, as will be apparent, the invention consists in the construction, combination and arrangement of parts, all as hereinafter more fully described, claimed and illustrated in the accompanying drawings, wherein:

Figs. 1, 2 and 3 show an embodiment of the present invention adapted to a high altitude aircraft to seal a rectangular opening provided in the floor of its pressure cabin in which a universally mounted control lever of the so-called "cradle" type, is mounted. The movement of the lever fore-and-aft in the cradle controls the elevator of the aircraft and the cradle, being journaled for transverse oscillation in a bearing fastened to the floor of the cabin and surrounding said opening, controls the ailerons of the aircraft.

Fig. 3 is a vertical section along line 3—3 of Fig. 2:

2

Figure 4:
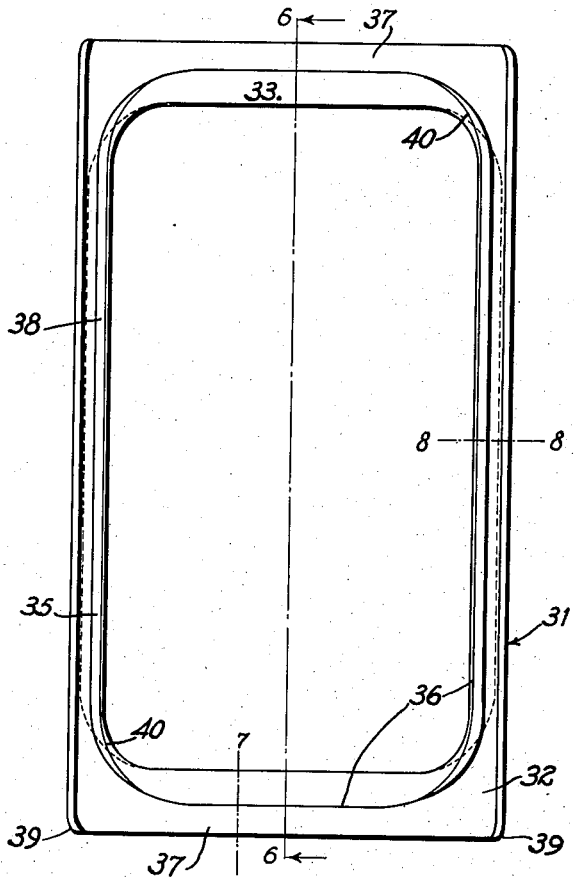
Fig. 4 is a plan view of the seal.
Figure 6:
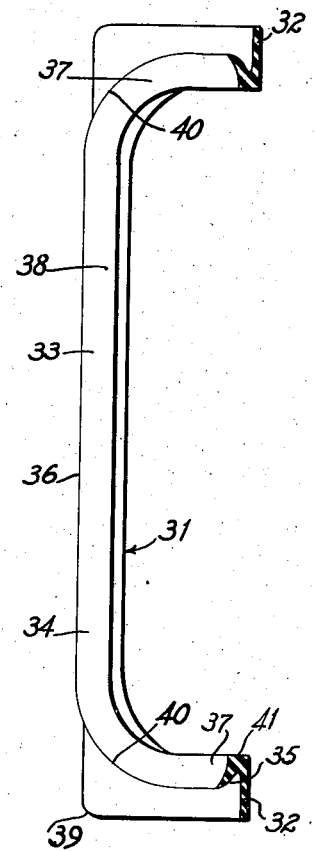
Figure 5:
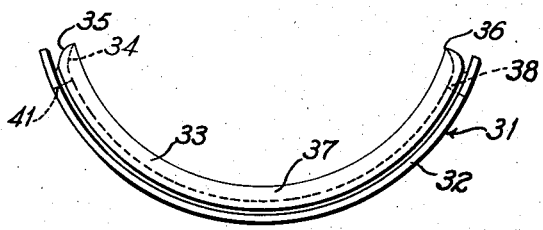

Fig. 5 is an end view thereof:

Fig. 6 is a longitudinal central section through the seal taken along line 6—6 of Fig. 4:

Fig. 7 is an enlarged section through the seal taken along line 7—7 of Fig. 4:

Fig. 8 is a similar section along line 8—8 of Fig. 4: and

Figure 1:
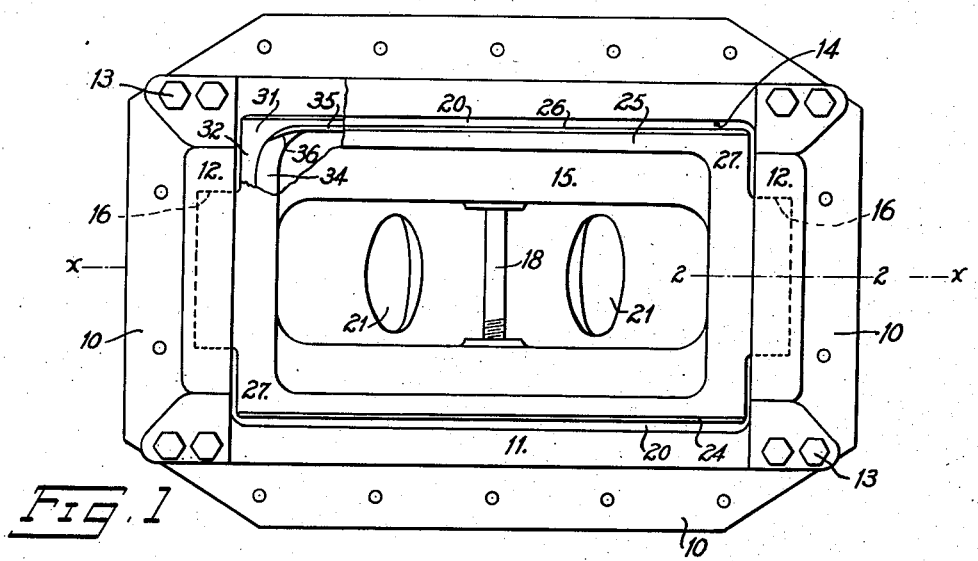
Fig. 1 is a plan view of the cradle and its frame in conjunction with the present seal, part of the frame and cradle being broken to show the seal, and the control lever being eliminated for clarity of illustration.
Figure 9:
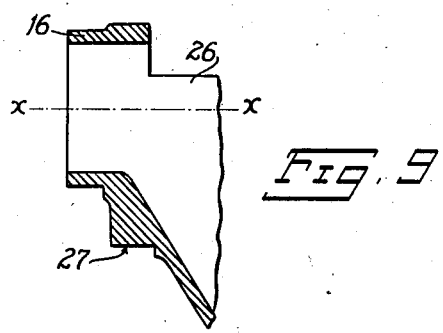

Fig. 9 is a fragmentary vertical section through one end of the cradle, being generally taken along line 2—2 of Fig. 1 to illustrate the relative positions of the elements thereof disassociated from coacting elements of its mounting.

Figure 2:
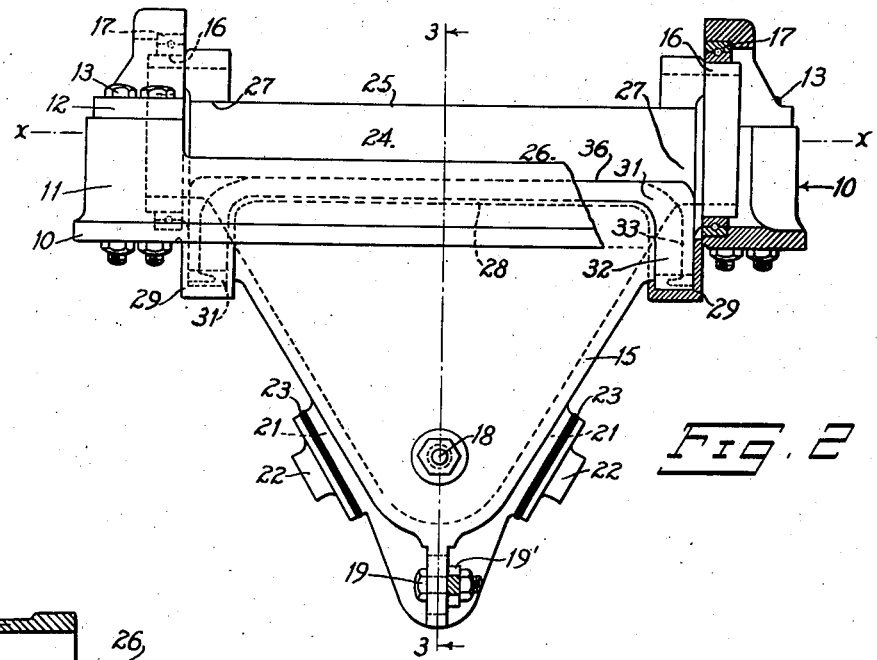
Fig. 2 is a side elevation thereof partly in central longitudinal section along line 2—2 of Fig. 1.

Reference being had more particularly to Figs. 1, 2 and 3 of the drawings, 10 designates the frame for mounting a conventional control lever of a high altitude aircraft having a pressure cabin (not shown) in which the air is maintained at a pressure substantially higher than the exterior atmospheric pressure. This frame 10—which is conventionally mounted at an opening in the floor of the pressure cabin—supports bearings of the split type, each consisting of the members 11 and 12 assembled together by means of bolts 13.

An air-tight gasket (not shown) is interposed between the frame 10 and the floor of the cabin to prevent any leak at this joint.

This frame 10 is substantially rectangular and surrounds central opening 14 in which is pivotally mounted the cradle 15. This cradle is substantially triangular and is provided with a pair of opposite hollow trunnions 16 mounted for oscillation in a ball bearing 17 housed in each set of bearings 11—12. The lower end of the control lever (not shown) is pivotally mounted on a bolt 18 traversing the cradle below the plane of the frame 10 and the floor of the cockpit on which the frame is supported. Directly above said frame 10 this stick or control lever is connected in the usual way to a push-pull rod (not shown) which reciprocates through one of the hollow trunnions 16 to extend to and operate the elevator. At its lower end the cradle 15 below the bolt 18 is provided with a pair of parallel bolts 19 by which the two conventional transverse push-pull rods 19' extending to and operating the ailerons are secured to the cradle.

Since the top of the cradle 15 is open, as at 20, to the pressure cabin, even when the joint between the frame 10 and the cradle 15 is effectively sealed, as hereinafter more completely described, the hollow body of the cradle 15 forms a continuation of the pressure cabin. Thus, in flight, there will be a pressure differential between the air inside and outside the cradle, and this differential is maintained by sealing all openings in the walls of the cradle, such as the repair and inspection openings 21, by any suitable means. For example the covers 22 and gaskets 23 may be used to effectively seal the openings 21.

In order to prevent the air under pressure within the cabin from escaping through the space between frame 10 and the cradle 15, a highly polished and smooth surface 24 is provided on the exterior of the cylindrical portion 25 of the cradle 15, which is concentric to the axis x—x of the trunnions 16. This cylindrical portion 25 is created by the opposed segments 26 symmetrically disposed on opposite sides of the axis x—x of the cradle 15.

These segments 26 at their extremities are interconnected by the trunnions 16 and below the trunnions and at each end of the cradle is a shoulder 27 which is coaxial to and below the axis x—x of the cradle. The shoulders 27 are smooth and highly polished on the outer surfaces in the same manner as the outer faces 24 of the segments 26. As will be hereinafter described the shoulders 27 function to seal the ends of the cradle 15 below the trunnions 16.

Fixed to frame 10 and parallel to the segments 26 are a pair of opposed U-channels 28, one located on each longitudinal side of cylindrical portion 25 of the cradle 15. At their ends the channels 28 are connected by a pair of curved U-channels 29 each of which rests below and spaced from one of the shoulders 27 of the cradle. The cooperating shoulders 27 and channels 29 are parallel and hence the channels 29 are coaxial to the axis x—x of the cradle 15. The channels 28 and 29 combine to form a continuous groove for the reception of a sealing member of packing strip 31. The continuous packing strip of seal 31, made of a molded resilient material such as rubber and formed as shown in detail in Figs. 4 to 8, is utilized to prevent the air under pressure within the cabin from escaping through the space or gap between the frame 10 and the cradle 15 by its cooperation with the outer surfaces of the segments 26 and the shoulders 27.

This seal 31 is substantially U-shaped in cross section; one side of the U forming a relatively flat mounting or retaining flange 32 and the other side forming a tapered and flexible sealing flange 33. The sealing flange 33 is made with its outer face 34 concaved and with its inner face 35 convexed, said faces converging to form a sealing edge 36. The base 41 of the U constitutes a relatively thick reinforcing heel of substantially rectangular cross section.

The seal 31 forms a continuous substantially rectangular frame having curved ends. The retaining flange 32 of this rectangular seal 31 is seated in the continuous groove of the channels 28 and 29 with those portions of the flange 32 on the curved ends 37 of the seal seated in the curved channels 29 and those portions of the flange 32 on the straight sides 38 of the seal seated in the channels 28 on the opposite sides of the cylindrical portion 25 of the cradle 15. With the retaining flange 32 of the seal 31 thus seated, the edge 36 of the sealing flange 33 is positioned against the outer surfaces of the segments 26 and of the shoulders 27.

While the corners 39 of the retaining flange 32 are substantially angular or square, the corresponding corners 40 of the sealing flange 33 are rounded on a relatively large radius. The curving of the corners 40 of the sealing flange 33 prevents leaks at these points which otherwise would result if the corners were substantially angular or curved upon a relatively short radius. It has been found that if the corners 40 are angular or if they are curved on a short radius the sealing flange 33 is so reinforced that it loses enough of its flexibility to prevent sealing coaction with the cradle at these points.

This seal is preformed, preferably by molding, not only to have its peculiar shape of an apertured cylindrical segment, but to provide an outward curvature for the flange 33 that is greatest prior to sealing coaction between the cradle 15 and said flange. This is illustrated in Figs. 7 and 8, where the position occupied by the flange 33 when coacting with the cradle is shown in dotted lines.

When assembling the seal, the retaining flange 32 thereof, prior to insertion of the cradle 15, is forced into the channels 28 and 29, so as to form an air-tight packing between said flange and the channels and a secure mounting for the seal 31. Obviously this retaining flange 32 could be bonded or secured in any other suitable way in the grooves of the channels 28 and 29 if that be desired or thought necessary. The insertion of the cradle 15 presses the sealing flange 33 outwardly by the contact of its cylindrical portion 25 (segments 26) thereby causing said flange to assume the dotted line position as shown in Figs. 7 and 8. Thus the sealing edge 36 of the flange 33 presses elastically against the smooth surfaces 24 of the segments 26 and against shoulders 27 with a pressure sufficient to create an air tight seal under all conditions and regardless of cabin pressure.

When pressure within the cabin is increased, additional sealing pressure is applied thereby to the convexed surface 35 of the sealing flange 33 to bring the edge 36 into even more intimate contact with the elements 26 and 27.

While the present seal has been described as being particularly designed for use in connection with the pressurized cabin of a high altitude aircraft and for especial use in conjunction with the control stick or control column of such an aircraft, this is manifestly merely one of its manifold uses, for it obviously can be employed to advantage wherever an oscillating member or lever operates through or within the wall of any enclosure which is isolated or insulated from the surrounding atmosphere for any purpose.

What is claimed is:

1. The combination with the wall of an enclosure having a substantially rectangular opening therein, of a trunnioned member mounted for oscillatory movement in said opening and including a cylindrical portion adjacent to and coaxial with its trunnions, a frame at said opening and entirely surrounding said member having bearings for the trunnions of said member and provided with a continuous channel, and a continuous resilient seal U-shaped in cross section one side of said seal forming a retaining flange confined in said channel and the other side thereof forming a tapering flexible flange, having an active blade edge which constantly and sealingly contacts said cylindrical portion by the elasticity of the material of the strip.

2. The combination with the wall of a pressure vessel having a substantially rectangular opening therein, of a trunnioned member mounted for oscillatory movement in said opening and having a cylindrical portion coaxial with its trunnions, a frame having bearings for the trunnions of and completely surrounding said member, a continuous channelled member carried by said frame, and a continuous resilient sealing strip of substantially U-section, one side of said U forming a retaining flange seated in said channelled member and the other side thereof forming a flexible sealing flange, the surfaces of which converge to create an active blade edge constantly and sealingly contacting said cylindrical portion, whereby the pressure within the vessel acts on one face of said flexible flange to complement its sealing contact with the cylindrical portion of said member.

3. In a high altitude aircraft having a pressure cabin, the combination with the floor of said cabin and a control lever trunnioned for oscillatory movement in an opening in said floor, of cylindrical portions formed on said lever between said trunnions and coaxial therewith, a frame circumscribing said opening and surrounding said lever and provided with bearings for said trunnions, a continuous channel carried by said frame, and a continuous resilient sealing strip of substantially U-section, one side of said U constituting a retaining flange confined in said channel and the other side thereof constituting a tapered flexible sealing flange the active edge of which constantly and sealingly contacts with said cylindrical portions by the cumulative effect of the inherent elasticity of the resilient material of said strip and of the pressure within the cabin acting on one side of said sealing flange.

4. In a high altitude aircraft having a pressure cabin, the combination with the floor of said cabin having a rectangular opening therein and a control member trunnioned for oscillatory movement in said rectangular opening, of a rectangular frame having outwardly extending horizontal flanges fastened to said floor, and a second rectangular frame surrounding said member below its horizontal plane of oscillation, said frame comprising two parallel straight sides and two curved ends projecting downward and coaxial with the trunnions of the control member, having a continuous channel formed in said sides and said ends to face said member, cylindrical segments carried on said member between its trunnions and opposite the straight sides of the second frame, cylindrical shoulders carried on said member opposite the curved ends of the second frame and coaxial therewith, and a continuous resilient sealing strip mounted in said channel and in constant contact with the outer faces of said segments and with the cylindrical faces of said shoulders.

5. In an aircraft having a pressurized cabin provided with an opening in its floor, the combination with a stationary frame circumscribing said opening, opposed and aligned bearings on said frame, a cradle having trunnions mounted for oscillation in the bearings of said frame having opposed bearing surfaces curved concentrically to the axis of the trunnions, a curved shoulder at each end of the cradle concentric to and positioned below the axis of the cradle, an open channel carried by said frame in opposition to each bearing surface, a curved channel concentric to the axis of the trunnions and carried by the frame in opposition to the curved shoulders aforesaid, and a unitary continuous seal seated in all of said channels including a part to sealingly engage with the bearing surfaces and the surfaces of the shoulders aforesaid.

6. In an aircraft having a pressurized cabin provided with an opening in its floor, the combination with a substantially rectangular open frame circumscribing said opening and fixed to said floor, aligned and opposed bearings carried by said frame, a channel carried by said frame adjacent each bearing and curved downwardly concentric to the axis of said bearings, side channels carried by the frame on opposed sides of the axis of said bearings for connecting the corresponding ends of said curved channels, a control cradle having opposed and outwardly extending trunnions mounted for oscillation in the bearings of the frame, opposed cylindrical surfaces carried by said cradle upon side of its axis for operation across said side channels, concentrically curved transverse shoulders at the extremities of said cylindrical surfaces operating over the curved channels aforesaid, and a rectangular elastic member seated in all of said channels and having a projecting member to sealingly operate against the cylindrical surfaces and the surfaces of the shoulders aforesaid.

7. In an aircraft having a pressurized cabin provided with an opening in its floor, the combination with a substantially rectangular open frame circumscribing said opening and fixed to said floor, aligned and opposed bearings carried by said frame, a channel carried by said frame adjacent each bearing and curved downwardly concentric to the axis of said bearings, side channels carried by the frame on opposed sides of the axis of said bearings for connecting the corresponding ends of said curved channels, a control cradle having opposed and outwardly extending trunnions mounted for oscillation in the bearings of the frame, opposed cylindrical surfaces carried by said cradle upon side of its axis for operation across said side channels, concentrically curved transverse shoulders at the extremities of said cylindrical surfaces operating over the curved channels aforesaid, and a unitary rectangular sealing member of U-section one arm of which comprises a continuous retaining flange seated in all of said channels and its other tapers outwardly to a feather edge to sealingly operate against said cylindrical surfaces and the surfaces of the shoulders.

8. The combination with an aircraft cabin having an opening in its floor, of a rectangular frame attached to the floor and circumscribing said opening, aligned bearings carried by certain of its sides, a transverse channel concentric to the axis of said bearings carried by the frame adjacent each bearing, opposed, parallel channels carried by the frame to connect said transverse channels upon each side of the bearings, a cradle, opposed trunnions thereon to oscillate in said bearings, outwardly curved surfaces on said cradle to operate respectively over the channels situated on opposed sides of the axis of said bearings, concentric shoulders on said cradle and extending between corresponding ends of said curved surfaces to operate over the transverse channels aforesaid, and a sealing member seated in said channels to operate against the cylindrical surfaces and said shoulders.

9. The combination with the pressure cabin of an aircraft having a control opening therein, a control cradle mounted to oscillate in said opening, external bearing surfaces on said cradle symmetrical and concentric to its axis of movement, and a sealing member surrounding said cradle and having a part thereof fixed to the cabin structure and an elastic flange extending in a direction toward the interior of the cabin to sealingly operate against said bearing surfaces and be additionally held in engagement therewith by the pressure within the cabin.

10. The combination with the pressure cabin of an aircraft having a control opening therein, a control cradle mounted to oscillate in said opening, external bearing surfaces on said cradle symmetrical and concentric to its axis of movement, a stationary member surrounding said cradle, and an elastic, flexible sealing flange carried by and tapering outwardly from said member to a feather edge, said flange extending in a direction toward the interior of the cabin for contact between its feather edge and said bearing surfaces and the exposure of that face thereof remote from said bearing surfaces to the cabin pressure.

PAUL PEVNEY.

REFERENCES CITED

The following references are of record in the file of this patent:

UNITED STATES PATENTS

| Number | Name | Date |
|---|---|---|
| 199,936 | Rowland | Feb. 5, 1878 |
| 1,076,962 | Doble | Oct. 28, 1913 |
| 1,563,161 | Christenson | Nov. 24, 1925 |
| 1,712,003 | Hubbard | May 7, 1929 |
| 2,199,410 | Lennon | May 7, 1940 |

FOREIGN PATENTS

| Number | Country | Date |
|---|---|---|
| 12,347 | Great Britain | 1848 |
| 653,604 | France | Nov. 15, 1928 |
| 697,876 | Germany | Oct. 25, 1940 |